(12) United States Patent
Liao et al.

(10) Patent No.: US 9,379,920 B1
(45) Date of Patent: Jun. 28, 2016

(54) DECISION FEEDBACK EQUALIZATION WITH PRECURSOR INTER-SYMBOL INTERFERENCE REDUCTION

(71) Applicant: Xilinx, Inc., San Jose, CA (US)

(72) Inventors: Yu Liao, Longmont, CO (US); Hongtao Zhang, San Jose, CA (US); Kun-Yung Chang, Los Altos Hills, CA (US); Geoffrey Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/707,919

(22) Filed: May 8, 2015

(51) Int. Cl.
*H04L 25/03* (2006.01)
*H04L 27/01* (2006.01)

(52) U.S. Cl.
CPC .......... *H04L 25/03057* (2013.01); *H04L 25/03* (2013.01); *H04L 25/03885* (2013.01); *H04L 27/01* (2013.01); *H04L 2025/03503* (2013.01)

(58) Field of Classification Search
CPC ......... H04L 25/03; H04L 27/01; H04L 27/06; H04L 27/22; H04L 2025/0349; H04L 25/03057; H04L 25/03617; H04L 25/03885; H04L 2025/03503
See application file for complete search history.

(56) References Cited

U.S. PATENT DOCUMENTS

| | | | | | |
|---|---|---|---|---|---|
| 5,414,733 | A | * | 5/1995 | Turner | H04L 25/03057 375/233 |
| 5,946,351 | A | * | 8/1999 | Ariyavisitakul | H04L 25/03057 375/233 |
| 2003/0161421 | A1 | * | 8/2003 | Schmidt | H04L 23/02 375/346 |
| 2003/0185323 | A1 | * | 10/2003 | Chen | H04L 25/03057 375/355 |
| 2004/0057513 | A1 | * | 3/2004 | Schenk | H04L 25/03057 375/233 |
| 2004/0184522 | A1 | * | 9/2004 | Kravtsov | H04L 25/03057 375/233 |
| 2012/0269255 | A1 | | 10/2012 | Pelteshki et al. | |
| 2013/0039407 | A1 | | 2/2013 | Aziz et al. | |
| 2013/0202065 | A1 | | 8/2013 | Chmelar | |

FOREIGN PATENT DOCUMENTS

WO 0211300 2/2002

* cited by examiner

*Primary Examiner* — Jean B Corrielus
(74) *Attorney, Agent, or Firm* — W. Eric Webostad

(57) ABSTRACT

In a receiver, a decision feedback equalizer ("DFE") receives an analog input signal. The DFE includes a subtraction block for subtracting weighted postcursor decisions from an analog input signal to provide an analog output signal. A postcursor decision block coupled to the DFE compares the analog output signal against positive and negative values of a postcursor coefficient to provide first and second possible decisions for selecting a current postcursor-based decision therebetween responsive to a previous postcursor-based decision. A precursor cancellation block receives the analog output signal, the previous postcursor-based decision and the current postcursor-based decision for providing a digital output signal for a previous sample of the analog input signal.

20 Claims, 8 Drawing Sheets

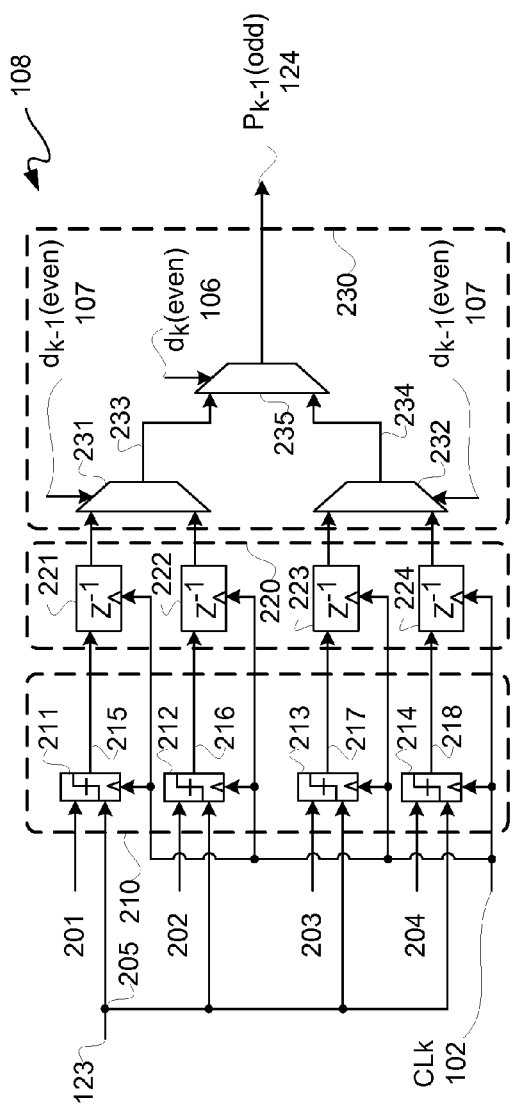
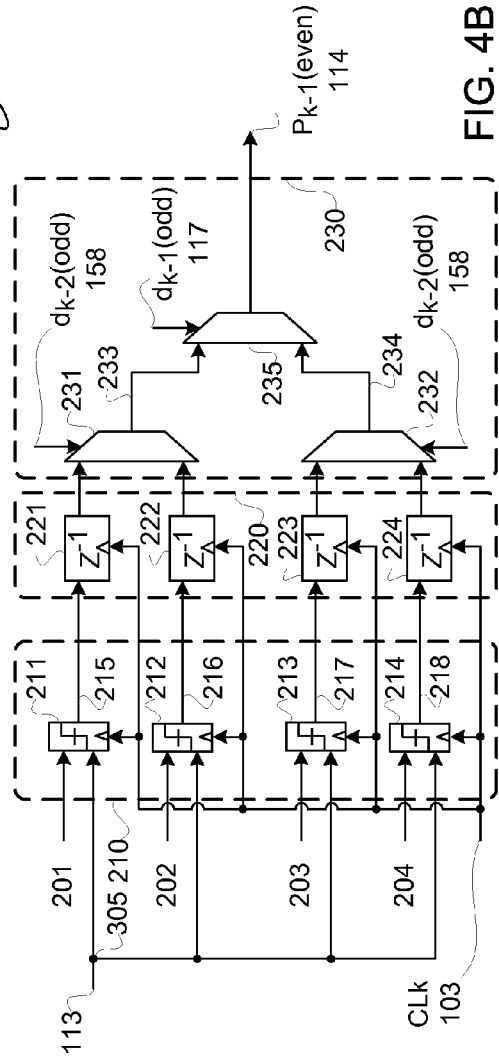

DECISION FEEDBACK EQUALIZATION WITH PRECURSOR INTER-SYMBOL INTERFERENCE REDUCTION

TECHNICAL FIELD

The following description relates to integrated circuit devices ("ICs"). More particularly, the following description relates to decision feedback equalization with precursor inter-symbol interference reduction for an IC.

BACKGROUND

In dispersive systems, a receiver may use equalization to clean up a signal for making data decisions. For example, in a serializer-deserializer ("SerDes") receiver, continuous time linear equalization (CTLE), feed-forward equalization ("FFE"), and decision feedback equalization ("DFE") may all be used. CTLE and DFE are mainly for reduction by cancellation of postcursor inter-symbol interference ("ISI") in modulated data transmissions received by such a receiver. FFE is for reduction by cancellation of precursor ISI. However, FFE may amplify noise and/or crosstalk in such reduction of precursor ISI. Hence, it is desirable to provide an IC that overcomes one or more limitations associated with reducing precursor ISI.

SUMMARY

A receiver generally relates to receiving information via a communications channel. In such a receiver, a decision feedback equalizer is for receiving an analog input signal. The decision feedback equalizer includes a subtraction block for subtracting a plurality of weighted postcursor decisions from the analog input signal to provide an analog output signal. A postcursor decision block is coupled to the decision feedback equalizer for receiving the analog output signal and comparing the analog output signal against positive and negative values of a postcursor coefficient to provide a first possible decision and a second possible decision, respectively, and for selecting a current postcursor-based decision as between the first possible decision and the second possible decision responsive to a previous postcursor-based decision. A precursor cancellation block is for receiving the analog output signal, the previous postcursor-based decision and the current postcursor-based decision for providing a digital output signal for a previous sample of the analog input signal.

Another receiver generally relates to receiving information via a communications channel. A first decision feedback equalizer and a second decision feedback equalizer are for receiving an analog input signal for providing a first plurality of weighted postcursor decisions and a second plurality of weighted postcursor decisions, respectively. The first decision feedback equalizer includes a first subtraction block for receiving the analog input signal for subtracting the first plurality of weighted postcursor decisions from the analog input signal for providing an odd analog output signal. The second decision feedback equalizer includes a second subtraction block for receiving the analog input signal for subtracting the second plurality of weighted postcursor decisions from the analog input signal for providing an even analog output signal. The first decision feedback equalizer and the second decision feedback equalizer is for clocking responsive a first clock signal and a second clock signal, respectively, out-of-phase with respect to one another for respectively providing the odd analog output signal and the even analog output signal. A first postcursor decision block and a second postcursor decision block are for receiving the odd analog output signal and the even analog output signal, respectively, for providing a current odd postcursor-based decision and a current even postcursor-based decision, respectively, for outputting responsive to the first clock signal and the second clock signal, respectively. A first precursor cancellation block is for receiving the odd analog output signal, a previous even postcursor-based decision and the current even postcursor-based decision for providing an odd digital output signal for a previous odd sample of the odd analog input signal. A second precursor cancellation block is for receiving the even analog output signal, a primary previous odd postcursor-based decision and a secondary previous odd postcursor-based decision for providing an even digital output signal for a previous even sample of an even analog input signal.

A method relates generally to receiver signal processing of received data from a communications channel. In such a method, an analog input signal is decision feedback equalized for providing a plurality of weighted postcursor decisions to a subtraction block. The subtraction block is of a decision feedback equalizer coupled for receiving the analog input signal. The plurality of weighted postcursor decisions being subtracted from the analog input signal to provide an analog output signal. The analog output signal is received by a postcursor decision block. The analog output signal is compared against positive and negative values of a postcursor coefficient. A first possible decision and a second possible decision, respectively, are provided responsive to the comparing of the analog output signal against the positive and negative values of the postcursor coefficient. A current postcursor-based decision is selected as between the first possible decision and the second possible decision responsive to a previous postcursor-based decision. The analog output signal, the previous postcursor-based decision, and the current postcursor-based decision are received by a precursor cancellation block. A digital output signal is provided for a previous sample of the analog input signal from the precursor cancellation block.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 4A is a block diagram depicting an exemplary odd precursor cancellation block, such as for the EDFE of FIG. 3.

FIG. 4B is a block diagram depicting an exemplary even precursor cancellation block, such as for the EDFE of FIG. 3.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

FFE precursor ISI reduction has limitations associated with noise and/or crosstalk amplification. As described below in additional detail, precursor ISI reduction may be incorporated into DFE to provide enhanced DFE. Such enhanced DFE may avoid, or at least improve upon, noise and/or crosstalk amplification associated with a conventional FFE.

With the above general understanding borne in mind, various configurations for enhanced decision feedback equalization for reducing precursor ISI are generally described below.

Figure 1:
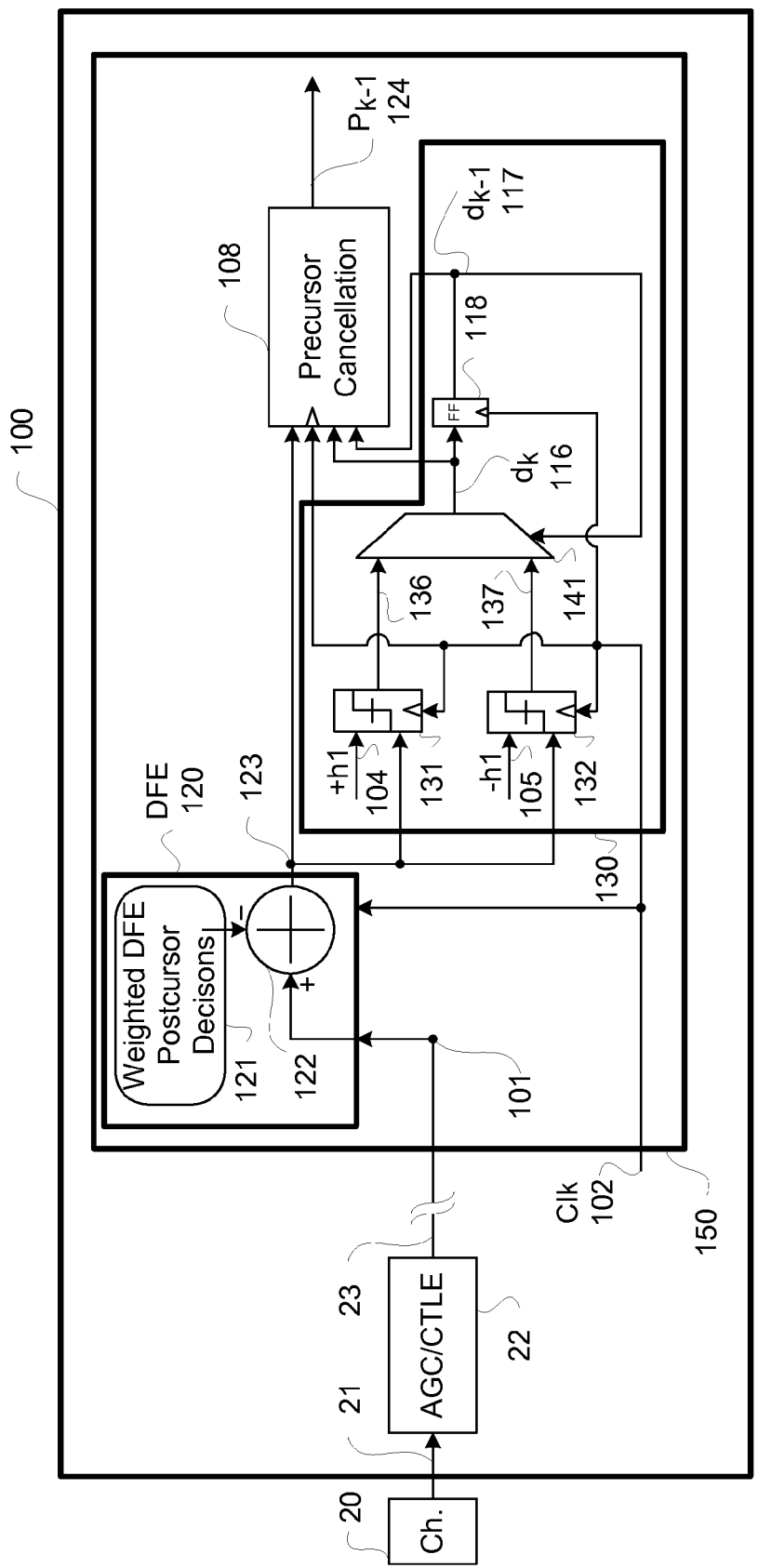
FIG. 1 is a block diagram depicting an exemplary receiver having a full-rate enhanced decision feedback equalizer ("EDFE").

FIG. 1 is a block diagram depicting an exemplary receiver 100. Receiver 100 may be for coupling to a communications channel 20 for receiving a modulated signal 21 for receiving data. Receiver 100 may include a pre-equalization block 22 and an analog enhanced decision feedback equalizer ("EDFE") 150 with precursor cancellation capability for processing modulated signal 21 to obtained received data therefrom. Receiver 100 may be a serializer-deserializer ("SerDes") receiver.

A decision feedback equalizer ("DFE") 120 of EDFE 150 may be for providing a plurality of weighted postcursor decisions 121 to a subtraction block 122 of DFE 120 for outputting an analog output signal 123. Subtraction block 122 of DFE 120 may be coupled for receiving an analog input signal 101 for subtracting weighted postcursor decisions 121 from analog input signal 101 for providing an analog output signal 123. Subtraction block 122 of DFE 120 may be a general representation of a decision finite impulse response ("DFIR") filter.

A postcursor decision block 130 of EDFE 150 may be coupled for receiving analog output signal 123 for comparing against a positive value 104 and negative value 105 of a postcursor coefficient h1 magnitude for providing a first possible decision 136 and a second possible decision 137, respectively, and for selecting a current postcursor-based decision 116 as between first possible decision 136 and second possible decision 137 responsive to a previous postcursor-based decision 117. Comparators 131 and 132 respectively output possible decisions 136 and 137, which may be provided as data inputs to multiplexer 141 of postcursor decision block 130. Multiplexer 141 may select a current postcursor-based decision 116 output $d_k$ as between possible decisions 136 and 137 input thereto. In this example, d indicates a decision, and k indicates an index of a sample.

In this example, a positive value 104 of coefficient h1, which may be a first postcursor coefficient, may be provided as one data input to a comparator 131 of postcursor decision block 130, and analog output signal 123 may be provided as another data input to comparator 131. Furthermore, in this example, a negative value 105 of coefficient h1 may be provided as one data input to a comparator 132 of postcursor decision block 130, and analog output signal 123 may be provided as another data input to comparator 132. Comparators 131 and 132, as well as DFE 120, may be clocked responsive to a clock signal 102.

Current postcursor-based decision 116 output from multiplexer 141 may be provided as an input to register ("FF") 118 of postcursor decision block 130. Register 118 may be clocked responsive to clock signal 102. A clocked output of register 118 may be a previous postcursor-based decision 117 output $d_{k-1}$, where k–1 is for a previous sample with respect to a current sample k. Previous postcursor-based decision 117 may be provided as a control-select input to multiplexer 141 for selection of a current postcursor-based decision 116.

A precursor cancellation block 108 of EDFE 150 may be coupled for receiving analog output signal 123, previous postcursor-based decision 117 and current postcursor-based decision 116, along with clock signal 102, for providing a final digital output signal 124 for a previous sample k–1 of analog input signal 123. Precursor cancellation block 108 may be configured for at least reducing precursor inter-symbol interference ("ISI") in analog output signal 123.

Figure 2:
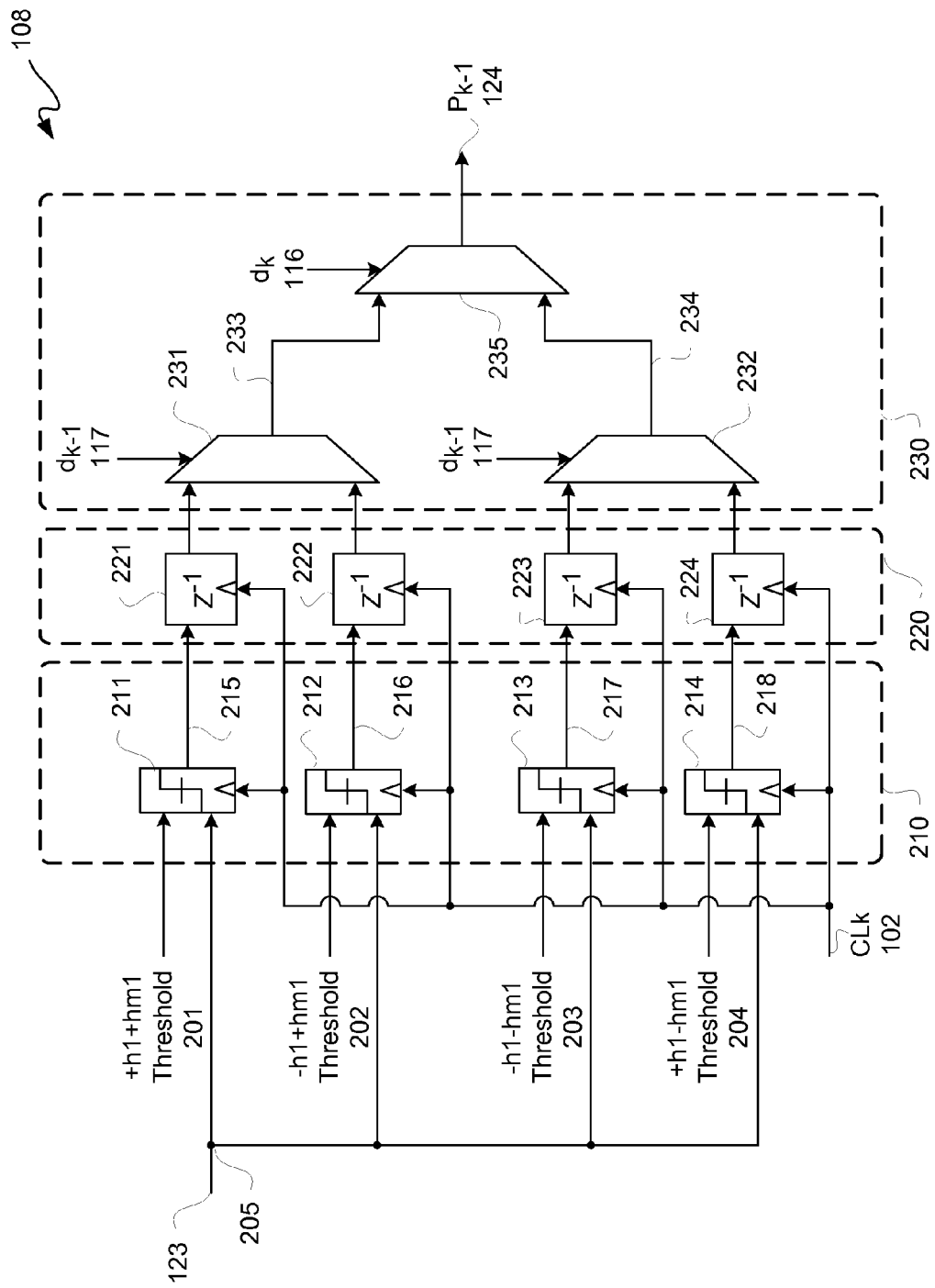
FIG. 2 is a block diagram depicting an exemplary precursor cancellation block for the EDFE of FIG. 1.

FIG. 2 is a block diagram depicting an exemplary precursor cancellation block 108. Precursor cancellation block 108 includes a comparison stage 210 and a selection stage 230. Precursor cancellation block 108 may optionally include a register stage 220 between stages 210 and 230. For purposes of clarity by way of example and not limitation, it shall be assumed that optional register stage 220 is included with precursor cancellation block 108.

Comparison stage 210 includes a plurality of comparators 211 through 214, where each of such comparators 211 through 214 may be commonly coupled to an input node 205 of precursor cancellation block 108 so each of such comparators receives analog output signal 123. Comparators 211 through 214 may each be clocked responsive to clock signal 102.

Additionally, comparators 211 through 214 may be coupled for respectively receiving threshold inputs 201 through 204. Threshold inputs 201 through 204 may be different from one another for respectively providing a plurality of "possible" digital outputs 215 through 218 respectively output from comparators 211 through 214. In this example, threshold inputs 201 and 202 correspond to positive precursor contributions to positive and negative postcursor contributions, namely respectively +h1+hm1 and –h1+hm1, and threshold inputs 203 and 204 correspond to negative precursor contributions to negative and positive postcursor contributions, namely respectively –h1–hm1 and +h1–hm1. Accordingly, coefficient h1 is associated with a postcursor ISI magnitude, and coefficient hm1, which is sometime expressed as h minus 1, is associated with a precursor ISI magnitude. Of course, a different order of these threshold inputs may be used in another implementation.

Comparators 211 through 214 may be commonly coupled for receiving analog output signal 123 and may be coupled for receiving first through fourth threshold inputs 201 through 204, respectively. Such combinations of input to comparators 211 through 214 may be corresponding first through fourth comparison inputs for providing first through fourth possible digital outputs 215 through 218, respectively, for analog output signal 123.

Possible digital outputs 215 through 218 are digital signals, but only one of which may be subsequently used as a final digital output 124. Accordingly, outcomes of comparisons by comparators 211 through 214 may be considered "possible" digital outputs, as only one of which is to be used as final digital output 124.

Each of possible digital outputs 215 through 218 may be either a logic 1 or 0 corresponding to comparison of analog output signal 123 with a corresponding threshold input of threshold inputs 201 through 204. Registers 221 through 224 of register stage 220 may be coupled to receive possible digital outputs 215 through 218, respectively, as data inputs to such register stage 220. Each of registers 221 through 224 may be clocked responsive to clock signal 102 to clock out each state registered therein of such possible digital outputs 215 through 218.

Selection stage 230 may be coupled for receiving possible digital outputs 215 through 218 for selection of final digital output signal 124 for a k−1 sample. In this example implementation, selection stage 230 includes multiplexers 231, 232, and 235.

A multiplexer 231 may be coupled to receive a possible digital output 215 and a possible digital output 216 as data inputs as associated with a positive precursor coefficient hm1 contribution. Multiplexer 231 may be coupled to receive previous postcursor-based decision 117 as a control select input for selecting of a possible digital outcome 233.

A multiplexer 232 may be coupled to receive a possible digital output 217 and a possible digital output 218 as data inputs as associated with a negative precursor coefficient hm1 contribution. Multiplexer 232 may be coupled to receive previous postcursor-based decision 117 as a control select input for selecting of a possible digital outcome 234.

A multiplexer 235 may be coupled to receive possible digital outcome 233 and possible digital outcome 234 as data inputs. Multiplexer 235 may be coupled to receive current postcursor-based decision 116 as a control select input for selecting digital output signal 124 as a final digital outcome for output from precursor cancellation block 108 for a k−1 sample.

EDFE 150 of FIG. 1 is an exemplary full-rate implementation. It may not be possible to meet a target transaction rate for a maximum frequency of EDFE 150 associated with a frequency of clock signal 102, for some applications. However, EDFE 150 is scalable for higher transaction rates by using multiple instances of circuitry thereof, as well as multiple phases of clock signal 102.

Figure 3:
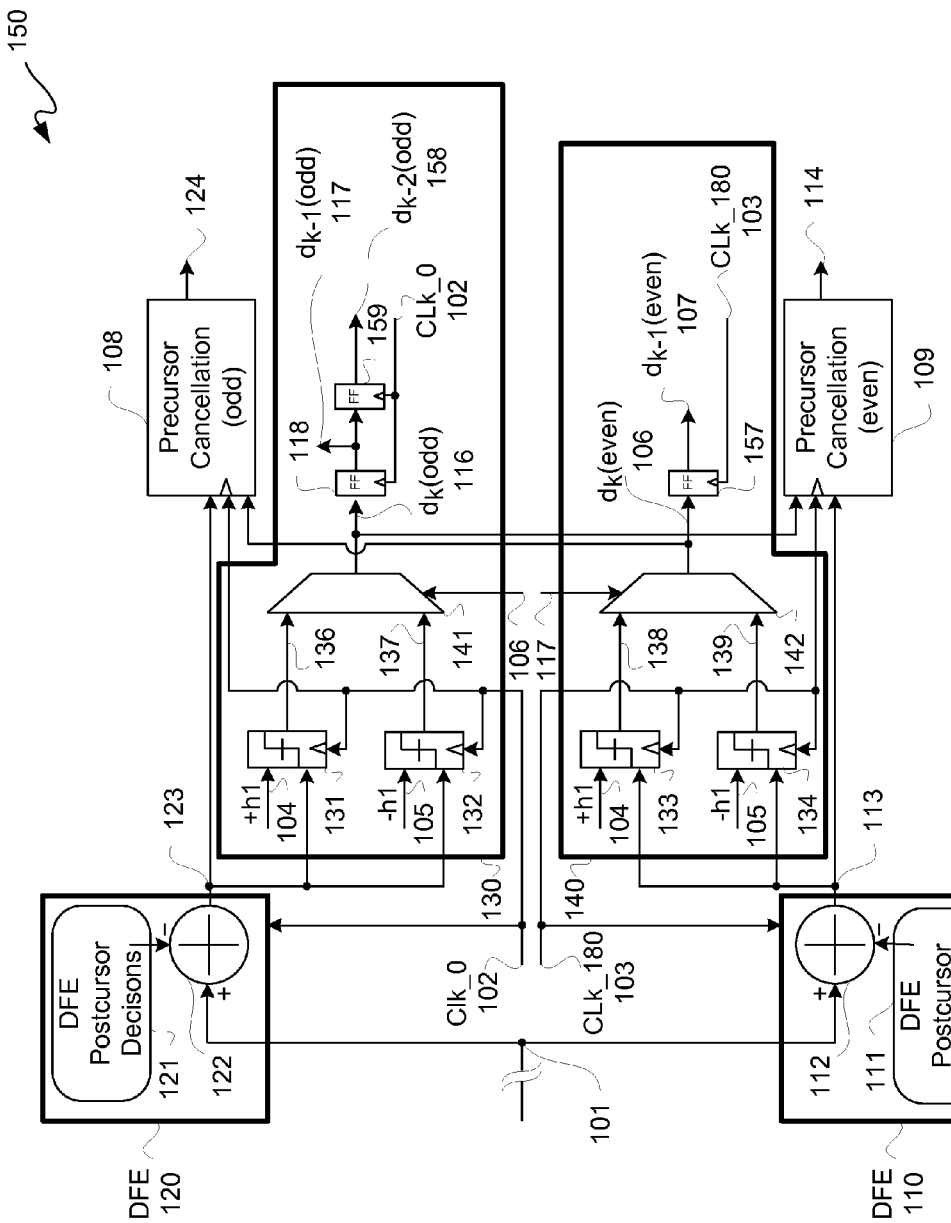
FIG. 3 is a block diagram depicting an exemplary half-rate EDFE, which may be used in the receiver of FIG. 1.

Along those lines, FIG. 3 is a block diagram depicting an exemplary half-rate EDFE 150, which may be in a receiver 100 of FIG. 1. For the following description of half-rate EDFE 150, two phases of clock signal 102 are be described. However, it will be understood that more than two phases of clock signal 102 may be used in other implementations. For purposes of clarity by way of example and not limitation, it shall be assumed that 0 and 180 degree phases of clock signal 102 are used. Moreover, as much of the description between FIGS. 1 and 3 is the same, repetition of some of such description is avoided for purposes of clarity and not limitation.

DFE 110 and 120 of EDFE 150 may be for providing sets of weighted postcursor decisions 121 and 111, respectively, to subtraction block 112 of DFE 110 and subtraction block 122 of DFE 120, respectively. DFEs 110 and 120 may be for outputting analog output signals 113 and 123, respectively. DFE 120 may be clocked responsive to phase 0 of clock signal 102, namely clock signal 102, and DFE 110 may be clocked responsive to phase 180 of clock signal 102, namely clock signal 103. Of course there may be some deviation from these phases, but generally clock signals 102 and 103 may be at least approximately 180 degrees out of phase with respect to one another and may be at least approximately the same frequency. Along those, lines, analog output signal 123 may be an "odd" analog output signal, and analog output signal 113 may be an "even" analog output signal.

If there is not sufficient time for processing all postcursor coefficients, a subset of all postcursor decisions may be used. Suppose there are postcursor coefficients h1 through hN, for N a positive integer greater than 1. Then, for example, weighted postcursor decisions 111 and 121 may be for coefficients h2 through hN, for N a positive integer greater than 2.

Subtraction blocks 112 and 122 respectively of DFEs 110 and 120 may be commonly coupled to an input node of EDFE 150 for receiving an analog input signal 101. Subtraction blocks 112 and 122 may be coupled for subtracting weighted postcursor decisions 111 and 121, respectively from analog input signal 101 for providing an even analog output signal 113 and an odd analog output signal 123, respectively. Subtraction blocks 112 and 122 of DFEs 110 and 120, respectively, may each be a DFIR filter.

Postcursor decision blocks 130 and 140 of EDFE 150 may be coupled for receiving analog output signals 123 and 113, respectively. Each of postcursor decision blocks 130 and 140 may be for comparing against a positive value 104 and a negative value 105 of a postcursor coefficient h1.

Along those lines, possible decisions 136 and 137, respectively, output from comparators 131 and 132 of post cursor decision block 130 may be clocked responsive to clock signal 102. Possible decisions 136 and 137 may be provided to multiplexer 141 for selecting a current odd postcursor-based decision 116 using a current even postcursor-based decision 106 as a control-select input to multiplexer 141. Possible decisions 138 and 139, respectively, output from comparators 133 and 134 of post cursor decision block 140 may be clocked responsive to clock signal 103. Possible decisions 138 and 139 may be provided to multiplexer 142 for selecting a current even postcursor-based decision 106 using a previous odd postcursor-based decision 117 as a control-select input to multiplexer 142.

In this example, a positive value 104 of coefficient h1 may be provided as one data input to a comparator 131 of postcursor decision block 130, and odd analog output signal 123 may be provided as another data input to comparator 131. Furthermore, in this example, a negative value 105 of coefficient h1 may be provided as one data input to a comparator 132 of postcursor decision block 130, and odd analog output signal 123 may be provided as another data input to comparator 132. Comparators 131 and 132, as well as DFE 120, may be clocked responsive to a clock signal 102.

In this example, a positive value 104 of coefficient h1 may be provided as one data input to a comparator 133 of postcursor decision block 140, and even analog output signal 113 may be provided as another data input to comparator 133. Furthermore, in this example, a negative value 105 of coefficient h1 may be provided as one data input to a comparator 134 of postcursor decision block 140, and even analog output signal 113 may be provided as another data input to comparator 134. Comparators 133 and 134, as well as DFE 110, may be clocked responsive to a clock signal 103.

With possible decisions 136 and 137, respectively output from comparators 131 and 132, provided as data inputs to multiplexer 141 of postcursor decision block 130, multiplexer 141 may select a current odd postcursor-based decision 116 output $d_K(odd)$ as between possible decisions 136 and 137 input thereto. With possible decisions 138 and 139, respectively output from comparators 133 and 134, provided as data inputs to multiplexer 142 of postcursor decision block 140, multiplexer 142 may select a current even postcursor-based decision 106 output $d_k$(even) as between possible decisions 138 and 139 input thereto.

Current odd postcursor-based decision 116 output from multiplexer 141 may be provided as an input to register 118 of postcursor decision block 130. Register 118 may be clocked responsive to clock signal 102. A clocked output of register 118 may be a previous odd postcursor-based decision 117 output $d_{k-1}$, where k−1 is for previous odd sample with respect to a current odd sample k. Previous odd postcursor-based decision 117 may be provided as a control-select input to multiplexer 142 for selection of a current even postcursor-based decision 106.

Previous odd postcursor-based decision 117 may be further provided as an input to register 159 of postcursor decision block 130. Register 159 may be clocked responsive to clock signal 102 to output a secondary previous odd postcursor-based decision 158 output $d_{k-2}$, where k−2 is for a previous odd sample with respect to a previous odd sample k−1 of previous odd postcursor-based decision 117. Previous odd postcursor-based decision 158 may be provided as a control-select input to a downstream multiplexer, as described below in additional detail.

Current even postcursor-based decision 106 output from multiplexer 142 may be provided as an input to register 157 of postcursor decision block 140. Register 157 may be clocked responsive to clock signal 103. A clocked output of register 157 may be a previous even postcursor-based decision 107 output $d_{k-1}$, where k−1 is for previous even sample with respect to a current even sample k. Previous even postcursor-based decision 107 may be provided as a control-select input to a downstream multiplexer, as described below in additional detail.

An odd precursor cancellation block 108 of EDFE 150 may be coupled for receiving odd analog output signal 123, previous even postcursor-based decision 107 and current even postcursor-based decision 106, along with clock signal 102, for providing a final odd digital output signal 124 for a previous sample k−1 of odd analog input signal 123. Precursor cancellation block 108 may be configured for at least reducing precursor ISI in odd analog output signal 123.

An even precursor cancellation block 109 of EDFE 150 may be coupled for receiving even analog output signal 113, previous odd postcursor-based decision 117, and previous odd postcursor-based decision 158, along with clock signal 103, for providing a final even digital output signal 114 for a previous sample k−1 of even analog input signal 113. Precursor cancellation block 109 may be configured for at least reducing precursor ISI in even analog output signal 113.

FIG. 4A is a block diagram depicting an exemplary odd precursor cancellation block 108, and FIG. 4B is a block diagram depicting an exemplary even precursor cancellation block 109. Other than select signals used for multiplexers in selection stage 230 of each of precursor cancellation blocks 108 and 109, such precursor cancellation blocks 108 and 109 are generally the same as one another, and the same as previously described for a full rate implementation. Accordingly, much of the description is not repeated from above for purposes of clarity and not limitation, and accordingly FIGS. 4A and 4B are simultaneously described with additional reference to FIGS. 1 through 3.

Odd precursor cancellation block 108 may be coupled to receive odd analog output signal 123 to an input node 205 of odd precursor cancellation block 108. Such odd analog output signal 123 may be processed as previously described through comparison stage 210 and register stage 220 of odd precursor cancellation block 108. Comparison stage 210 and register stage 220 of odd precursor cancellation block 108 may both be clocked responsive to clock signal 102.

Even precursor cancellation block 109 may be coupled to receive even analog output signal 113 to an input node 305 of even precursor cancellation block 109. Such even analog output signal 113 may be processed as previously described through comparison stage 210 and register stage 220 of even precursor cancellation block 109. Comparison stage 210 and register stage 220 of even precursor cancellation block 109 may both be clocked responsive to clock signal 103.

Selection stage 230 of odd precursor cancellation block 108 may be coupled for receiving possible odd digital outputs 215 through 218 thereof for selection of a final odd digital output signal 124 for a k−1 previous sample. A multiplexer 231 may be coupled to receive a possible odd digital output 215 and a possible odd digital output 216 as data inputs as associated with a positive precursor coefficient hm1 contribution. Multiplexer 231 may be coupled to receive a previous even postcursor-based decision 107 as a control select input for selecting of a possible odd digital outcome 233. A multiplexer 232 may be coupled to receive a possible odd digital output 217 and a possible odd digital output 218 as data inputs as associated with a negative precursor coefficient hm1 contribution. Multiplexer 232 may be coupled to receive previous even postcursor-based decision 107 as a control select input for selecting of a possible odd digital outcome 234.

A multiplexer 235 of odd precursor cancellation block 108 may be coupled to receive possible odd digital outcome 233 and possible odd digital outcome 234 as data inputs. Multiplexer 235 may be coupled to receive current even postcursor-based decision 106 as a control select input for selecting an odd digital output signal 124 as a final odd digital outcome for output from odd precursor cancellation block 108 for a k−1 sample.

Selection stage 230 of even precursor cancellation block 109 may be coupled for receiving possible even digital outputs 215 through 218 thereof for selection of a final even digital output signal 114 for a k−1 previous sample. A multiplexer 231 may be coupled to receive a possible even digital output 215 and a possible even digital output 216 as data inputs as associated with a positive precursor coefficient hm1 contribution. Multiplexer 231 may be coupled to receive a secondary previous odd postcursor-based decision 158 as a control select input for selecting of a possible even digital outcome 233. A multiplexer 232 may be coupled to receive a possible even digital output 217 and a possible even digital output 218 as data inputs as associated with a negative precursor coefficient hm1 contribution. Multiplexer 232 may be coupled to receive such a secondary previous odd postcursor-based decision 158 as a control select input for selecting of a possible even digital outcome 234.

A multiplexer 235 of even precursor cancellation block 109 may be coupled to receive possible even digital outcome 233 and possible even digital outcome 234 as data inputs. Multiplexer 235 may be coupled to receive primary previous odd postcursor-based decision 117 as a control select input for selecting an even digital output signal 114 as a final even digital outcome for output from even precursor cancellation block 109 for a k−1 sample.

Figure 5:
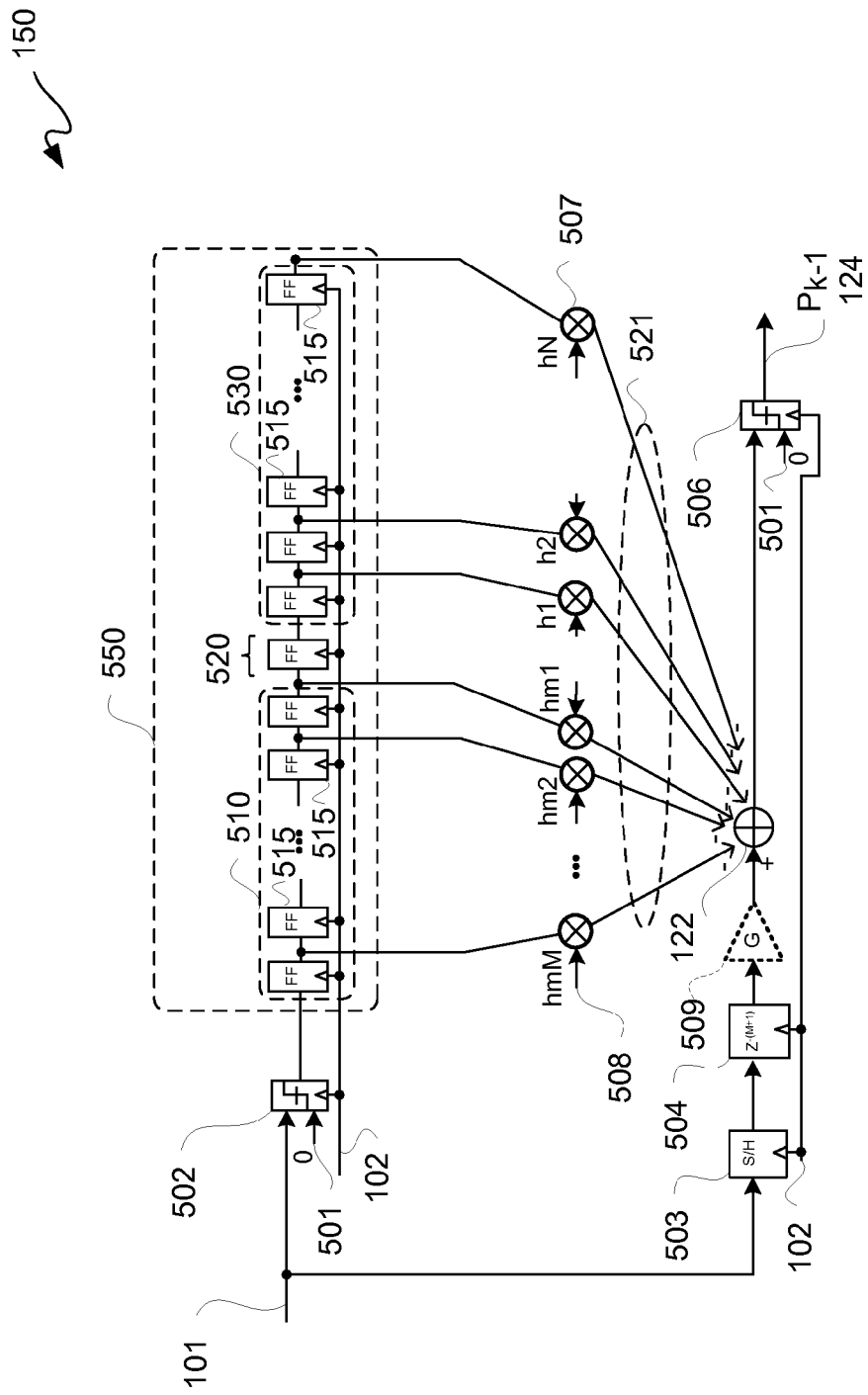
FIG. 5 is a schematic diagram depicting another exemplary EDFE, though using a sample and hold circuit.

FIG. 5 is a schematic diagram depicting another exemplary EDFE 150. EDFE 150 of FIG. 5 includes an input comparator ("input data slicer") 502, a delay line 550, a plurality of multipliers 507, a sample and hold block ("S/H") 503, a delay block 504, an optional gain amplifier 509, a DFIR 122, and an output data slicer 506.

Analog input signal 101 is provided as a data input to input data slicer 502 and to S/H 503 from a common input node thereto. S/H 503, delay line 550, delay block 504, and output data slicer 506 are all coupled clocked responsive to clock signal 102.

Analog input signal 101 may be the output of an equalizer, such as a DFE or a CTLE. Input data slicer 502 is coupled to a zero volt input 501 as a threshold input for comparison against levels of analog input signal 101, such as for non-return to zero ("NRZ") modulation for example. However, pulse amplitude modulation ("PAM") or other modulation may likewise be used in systems with a dispersive effect where equalization is used, and a threshold input 501 may be different for different modulations.

Output of input data slicer 502 is provided as an input to a delay line 550 formed of a series of registers 515 with taps between registers. An initial portion of delay line 550 may be M registers of a precursor stage 510; a middle portion of delay line 550 may be a 1-stage main cursor register stage 520; and a later portion of delay line 550 may be N registers of a postcursor stage 530. Of course, in this example, M and N are positive integers greater than one.

Taps of precursor stage 510 may provide respective inputs to corresponding multipliers 507. Other inputs to multipliers may be corresponding FIR filter coefficients, namely cancellation coefficients 508. Along those lines, positive values of precursor ISI coefficients hmM to hm1 may be input to corresponding multipliers 507 for correspondence from a first to a last tap, where hm1 is a first precursor tap and hmM an Mth precursor tap in this example, of precursor stage 510. Positive values of postcursor ISI coefficients h1 to hN may be input to corresponding multipliers 507 for correspondence from a first to last tap of postcursor stage 530. Actual values of these coefficients, h1 to hN and hm1 to hmM, may be either positive or negative. An analog-to-digital converter (not shown) may be used to convert analog values of hmM to hm1 and h1 to hN into corresponding digital values for corresponding inputs to multipliers 507. This is to be contrasted with a conventional analog FFE, in addition to cancellation of both precursor and postcursor ISI without noise or crosstalk being prevalent in such decisions. Moreover, a least mean square ("LMS") block, not shown, may be used for adaptation of hm1 to hmM and h1 to hN ISI cancellation coefficients 508. Outputs of multipliers 507 may be weighted DFE precursor and postcursor decisions 521 for input to a minus port of DFIR 122.

This top path of EDFE 150 may or may not include a conventional DFE. Along those lines, an input node of EDFE 150 may be coupled to a conventional DFE which may re-use decisions from such illustratively depicted top path. In such an implementation, corresponding postcursor taps of postcursor stage 530 may be decoupled from DFIR 122, as such equalization may take place in such conventional DFE. However, for purposes of clarity by way of example and not limitation, it shall be assumed that such top path of EDFE 150 is operated in parallel with a bottom path thereof.

In parallel with input data slicer 502 and delay line 550, S/H 503 may receive analog input signal 101, and such sampled and held analog input signal 101 may be output from S/H 503 for input to an M+1 stage delay block 504. By cancelling out, including reducing with or without residue, precursor and postcursor ISI without amplifying noise and crosstalk, EDFE 150 may provide improved signal-to-noise ratio ("SNR") and an improved bit error rate ("BER") as compared with a conventional DFE. Along those lines, S/H 503 may be used to store a sample of an analog input signal which may be associated for a number of clock cycles of clock signal 102 as a partially equalized portion propagating through delay line 550. In other words, while postcursor results may be available for a current analog sample, there is some delay associated with getting precursor results for such then current analog sample.

By having M+1 bit delays by delay block 504 after S/H 503, M precursor ISI cancellation associated registers 515 and associated multipliers 507 of precursor stage 510 of delay line 550 may be populated for precursor cancellation, in addition to postcursor cancellation via delay line 550 and associated multipliers 507 of postcursor stage 530 of delay line 550, and this cancellation may occur at a common DFIR 122 by outputting both sets of weighted decisions to a minus port thereof. In short, by delaying a "pre-decision" of an analog input signal 101, a better final decision may be obtained.

Output of delay block 504 may optionally be provided to an amplifier 509 to adjust gain. Gain may be added in such an EDFE 150 forward path to further enhance a data eye opening. Output of amplifier 509 may be input to a plus port of DFIR 122.

DFIR 122 may be used for subtracting postcursor and precursor ISI 521 output from multipliers 507 to a minus port of DFIR 122 from a delayed sample of an analog input signal 101, as previously described. Accordingly, postcursor and precursor ISI, if present, may be at least reduced, if not cancelled, by DFIR 122 for providing a cleaned-up output to output data slicer 506.

Output data slicer 506 is coupled to a zero volt input 501 as a threshold input for comparison against levels of a cleaned-up output signal of DFIR 122, such as for NRZ modulation for example. Output data slicer 506 may output decisions or data for a digital output signal 124, which may be a final digital outcome for a corresponding analog sample of analog input signal 101.

Due to power consumption associated with operation of S/H 503, such FIG. 5 implementation of EDFE 150 may be problematic in some applications.

Figure 6:
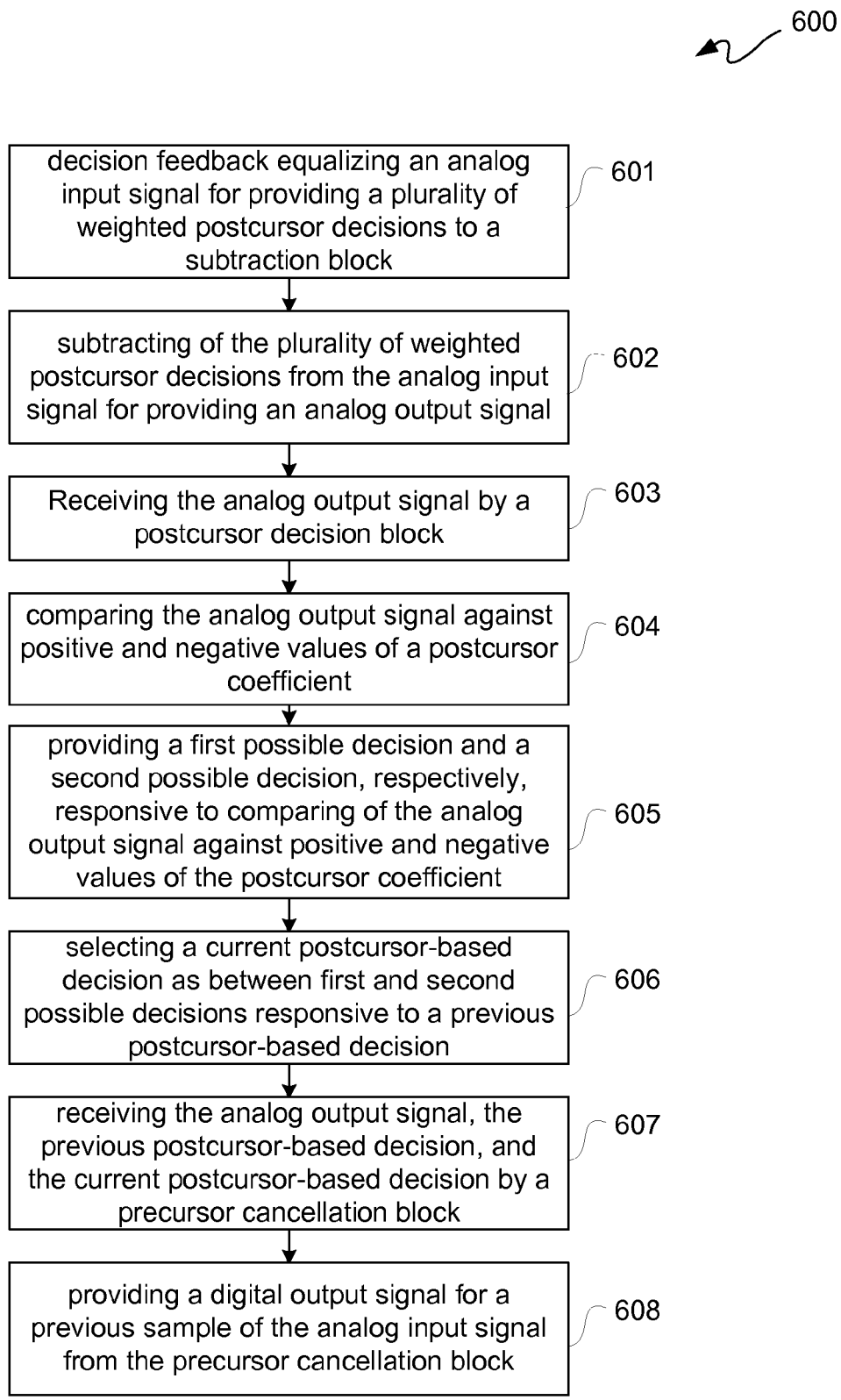
FIG. 6 is a flow diagram depicting an exemplary process for the receiver 100 of FIG. 1 for signal processing of received data from a communications channel.
Figure 7:
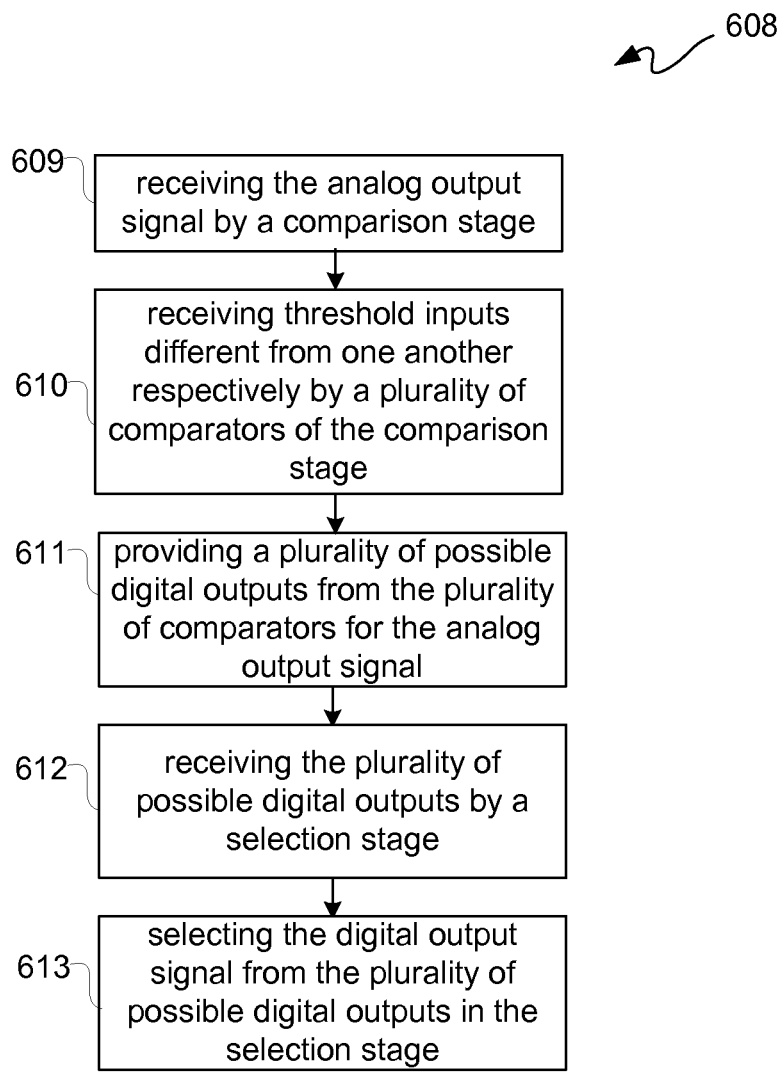
FIG. 7 is a flow diagram depicting an exemplary sub-process of the process of FIG. 6.

FIG. 6 is a flow diagram depicting an exemplary process 600 for receiver 100 of FIG. 1 signal processing of received data from a communications channel 20. FIG. 7 is a flow diagram depicting an exemplary sub-process 608 of process 600 of FIG. 6. Accordingly, FIGS. 6 and 7 are further described with additional reference to FIGS. 1 and 2.

At 601, decision feedback equalizing of an analog input signal 101 for providing a plurality of weighted postcursor decisions 121 to a subtraction block 122 thereof may be performed. This subtraction block 122 may be of a DFE 120 coupled for receiving an analog input signal 101.

At 602, subtracting of plurality of weighted postcursor decisions 121 from analog input signal 101 may be performed for providing an analog output signal 123. At 603, analog output signal 123 may be received by a postcursor decision block 130. At 604, analog output signal 123 may be compared against positive and negative values 104 and 105 of a postcursor coefficient, h1.

At 605, a first possible decision 136 and a second possible decision 137, respectively, may be provided responsive to comparing of analog output signal 123 against positive and negative values 104 and 105 of postcursor coefficient h1. At 606, a current postcursor-based decision 116 may be selected as between first possible decision 136 and second possible decision 137 responsive to a previous postcursor-based decision 117.

At 607, analog output signal 123, previous postcursor-based decision 117, and current postcursor-based decision 116 may be received by a precursor cancellation block 108. At 608, a digital output signal 124 may be provided for a previous sample of analog input signal 123 from precursor cancellation block 108.

Operations within precursor cancellation block 108 for providing at 608 such a digital output signal 124, may include operations 609 through 613 of FIG. 7.

At 609, analog output signal 123 may be received by comparison stage 210. At 610, threshold inputs 201 through 204 different from one another may be respectively received by comparators 211 through 214 of comparison stage 210.

At 611, possible digital outputs 215 through 218 may be respectively provided from comparators 211 through 214 for analog output signal 123. At 612, possible digital outputs 215 through 218 may be received by selection stage 230. At 613, digital output signal 124 may be selected based on DFE decisions from possible digital outputs 215 through 218 in selection stage 230.

As previously described, EDFE 150 may be scaled, which may be used in an ASIC, ASSP, or more adaptably in an FPGA. Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
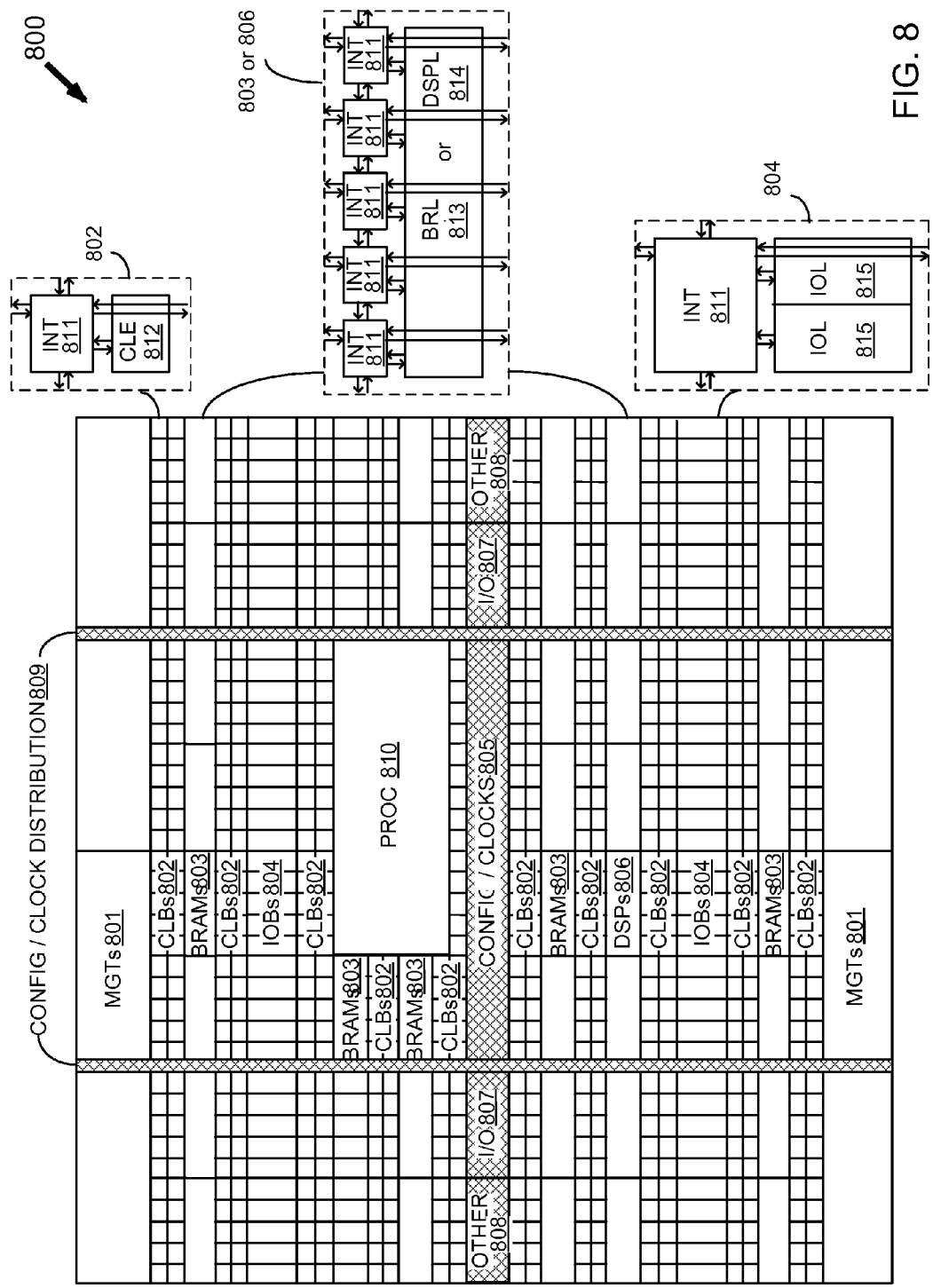
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An 10B 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

The invention claimed is:

1. A receiver for coupling to a communications channel, comprising:
   a decision feedback equalizer for receiving an analog input signal, wherein the decision feedback equalizer includes a filter for subtracting a plurality of weighted postcursor decisions from the analog input signal to provide an analog output signal;
   a postcursor decision circuit coupled to the decision feedback equalizer for receiving the analog output signal and comparing the analog output signal against positive and negative values of a postcursor coefficient to provide a first possible decision and a second possible decision, respectively, and for selecting a current postcursor-based decision as between the first possible decision and the second possible decision responsive to a previous postcursor-based decision; and
   a precursor cancellation circuit for receiving the analog output signal, the previous postcursor-based decision and the current postcursor-based decision for providing a digital output signal for a previous sample of the analog input signal.

2. The receiver according to claim 1, wherein:
   the precursor cancellation circuit comprises a comparison circuit and a selection circuit;
   the comparison circuit comprises a plurality of comparators for receiving the analog output signal and for respectively receiving threshold inputs different from one another for providing a plurality of possible digital outputs for the analog output signal; and
   the selection circuit is coupled to receive the plurality of possible digital outputs for selection of the digital output signal.

3. The receiver according to claim 2, wherein:
   the threshold inputs comprise −h1−hm1, +h1−hm1, −h1+hm1, and +h1+hm1 for h1 associated with a postcursor inter-symbol interference ("ISI") magnitude and hm1 associated with a precursor ISI magnitude; and
   the filter of the decision feedback equalizer includes a decision finite impulse response ("DFIR") filter.

4. The receiver according to claim 1, wherein the postcursor decision circuit comprises:
   a first comparator for receiving the analog output signal for comparing against a positive h1 value for the postcursor coefficient for providing the first possible decision;
   a second comparator for receiving the analog output signal for comparing against a negative h1 value of the postcursor coefficient for providing the second possible decision; and
   a multiplexer for receiving the first possible decision and the second possible decision as data inputs and for receiving the previous postcursor-based decision as a control select input for selecting the current postcursor-based decision as between the first possible decision and the second possible decision.

5. The receiver according to claim 2, wherein the comparison circuit of the precursor cancellation circuit comprises:
   a first comparator for receiving the analog output signal and a first threshold input of the threshold inputs for providing a first possible digital output of the plurality of possible digital outputs for the analog output signal;
   a second comparator for receiving the analog output signal and a second threshold input of the threshold inputs for providing a second possible digital output of the plurality of possible digital outputs for the analog output signal;
   a third comparator for receiving the analog output signal and a third threshold input of the threshold inputs for providing a third possible digital output of the plurality of possible digital outputs for the analog output signal; and
   a fourth comparator for receiving the analog output signal and a fourth threshold input of the threshold inputs for providing a fourth possible digital output of the plurality of possible digital outputs for the analog output signal.

6. The receiver according to claim 5, wherein the first threshold input, the second threshold input, the third threshold input, and the fourth threshold input respectively equal −h1−hm1, +h1−hm1, −h1+hm1, and +h1+hm1 for h1 associated with a postcursor inter-symbol interference ("ISI") magnitude and hm1 associated with a precursor ISI magnitude.

7. The receiver according to claim 6, wherein the selection circuit comprises:
   a first multiplexer coupled to receive the first possible digital output and the second possible digital output as first data inputs and coupled to receive the previous postcursor-based decision as a first control select input for selection of a first possible digital outcome;
   a second multiplexer coupled to receive the third possible digital output and the fourth possible digital output as second data inputs and coupled to receive the previous postcursor-based decision as a second control select input for selection of a second possible digital outcome; and
   a third multiplexer coupled to receive the first possible digital outcome and the second possible digital outcome as third data inputs and coupled to receive the current postcursor-based decision as a third control select input for selection of the digital output signal.

8. A receiver for coupling to a communications channel, comprising:
   a first decision feedback equalizer and a second decision feedback equalizer for receiving an analog input signal for providing a first plurality of weighted postcursor decisions and a second plurality of weighted postcursor decisions, respectively;
   wherein the first decision feedback equalizer includes a first filter for receiving the analog input signal for subtracting the first plurality of weighted postcursor decisions from the analog input signal for providing an odd analog output signal;

wherein the second decision feedback equalizer includes a second filter for receiving the analog input signal for subtracting the second plurality of weighted postcursor decisions from the analog input signal for providing an even analog output signal;

the first decision feedback equalizer and the second decision feedback equalizer for clocking responsive a first clock signal and a second clock signal, respectively, out-of-phase with respect to one another for respectively providing the odd analog output signal and the even analog output signal;

a first postcursor decision circuit and a second postcursor decision circuit for receiving the odd analog output signal and the even analog output signal, respectively, for providing a current odd postcursor-based decision and a current even postcursor-based decision, respectively, for outputting responsive to the first clock signal and the second clock signal, respectively;

a first precursor cancellation circuit for receiving the odd analog output signal, a previous even postcursor-based decision and the current even postcursor-based decision for providing an odd digital output signal for a previous odd sample of the odd analog output signal; and a second precursor cancellation circuit for receiving the even analog output signal, a primary previous odd postcursor-based decision and a secondary previous odd postcursor-based decision for providing an even digital output signal for a previous even sample of the even analog output signal.

9. The receiver according to claim 8, wherein:
the first precursor cancellation circuit comprises a first comparison circuit and a first selection circuit;
the second precursor cancellation circuit comprises a second comparison circuit and a second selection circuit;
wherein the first comparison circuit includes a first plurality of comparators for receiving the odd analog output signal and for respectively receiving threshold inputs different from one another for providing a first plurality of possible digital outputs for the odd analog output signal;
wherein the first selection circuit is coupled to receive the first plurality of possible digital outputs for selection of the odd digital output signal;
wherein the second comparison circuit includes a second plurality of comparators for receiving the even analog output signal and for respectively receiving the threshold inputs different from one another for providing a second plurality of possible digital outputs for the even analog output signal; and
wherein the second selection circuit is coupled for receiving the second plurality of possible digital outputs for selection of the even digital output signal.

10. The receiver according to claim 9, wherein each of the first postcursor decision circuit and the second postcursor decision circuit are for comparing against positive and negative values of a postcursor coefficient for respectively providing a first pair of possible decisions and a second pair of possible decisions, respectively, and for respectively selecting the current odd postcursor-based decision as between the first pair of possible decisions and the current even postcursor-based decision as between the second pair of possible decisions respectively responsive to the current even postcursor-based decision and the primary previous odd postcursor-based decision.

11. The receiver according to claim 9, wherein the threshold inputs comprise −h1−hm1, +h1−hm1, −h1+hm1, and +h1+hm1 for h1 associated with a postcursor inter-symbol interference ("ISI") magnitude and hm1 associated with a precursor ISI magnitude.

12. The receiver according to claim 9, wherein the first filter and the second filter are a first decision finite impulse response ("DFIR") filter and a second DFIR filter, respectively.

13. The receiver according to claim 10, wherein the positive and negative values of the postcursor coefficient are for an h1 postcursor coefficient magnitude.

14. A method for receiver signal processing received data from a communications channel, the method comprising:
decision feedback equalizing an analog input signal for providing a plurality of weighted postcursor decisions to a filter;
wherein the filter is of a decision feedback equalizer coupled for receiving the analog input signal;
subtracting of the plurality of weighted postcursor decisions from the analog input signal for providing an analog output signal;
receiving the analog output signal by a postcursor decision circuit;
comparing the analog output signal against positive and negative values of a postcursor coefficient;
providing a first possible decision and a second possible decision, respectively, responsive to the comparing of the analog output signal against the positive and negative values of the postcursor coefficient;
selecting a current postcursor-based decision as between the first possible decision and the second possible decision responsive to a previous postcursor-based decision;
receiving the analog output signal, the previous postcursor-based decision, and the current postcursor-based decision by a precursor cancellation circuit; and
providing a digital output signal for a previous sample of the analog input signal from the precursor cancellation circuit.

15. The method according to claim 14, wherein the precursor cancellation circuit comprises a comparison circuit and a selection circuit, the method further comprising:
receiving the analog output signal by the comparison circuit;
receiving threshold inputs different from one another respectively by a plurality of comparators of the comparison circuit;
providing a plurality of possible digital outputs respectively from the plurality of comparators for the analog output signal;
receiving the plurality of possible digital outputs by the selection circuit; and
selecting the digital output signal from the plurality of possible digital outputs in the selection circuit.

16. The method according to claim 15, wherein:
the threshold inputs comprise −h1−hm1, +h1−hm1, −h1+hm1, and +h1+hm1 for h1 associated with a postcursor inter-symbol interference ("ISI") magnitude and hm1 associated with a precursor ISI magnitude; and
the filter of the decision feedback equalizer is a decision finite impulse response ("DFIR") filter.

17. The method according to claim 14, wherein the postcursor decision circuit is for steps comprising:
receiving the analog output signal by a first comparator of the postcursor decision circuit for comparing against a positive h1 value of the postcursor coefficient for providing the first possible decision;
receiving the analog output signal by a second comparator of the postcursor decision circuit for comparing against a negative h1 value of the postcursor coefficient for providing the second possible decision; and receiving by a multiplexer of the postcursor decision circuit the first possible decision and the second possible decision as data inputs and for receiving the previous postcursor-based decision as a control select input for selecting the current postcursor-based decision as between the first possible decision and the second possible decision responsive to the previous postcursor-based decision.

18. The method according to claim 15, wherein the comparison circuit of the precursor cancellation circuit is for steps comprising:

receiving by a first comparator of the precursor cancellation circuit the analog output signal and a first threshold input of the threshold inputs as first comparison inputs for providing a first possible digital output of the plurality of possible digital outputs for the analog output signal;

receiving by a second comparator of the precursor cancellation circuit the analog output signal and a second threshold input of the threshold inputs as second comparison inputs for providing a second possible digital output of the plurality of possible digital outputs for the analog output signal;

receiving by a third comparator of the precursor cancellation circuit the analog output signal and a third threshold input of the threshold inputs as third comparison inputs for providing a third possible digital output of the plurality of possible digital outputs for the analog output signal; and receiving by a fourth comparator of the precursor cancellation circuit the analog output signal and a fourth threshold input of the threshold inputs as fourth comparison inputs for providing a fourth possible digital output of the plurality of possible digital outputs for the analog output signal.

19. The method according to claim 18, wherein the first threshold input, the second threshold input, the third threshold input, and the fourth threshold input respectively equal $-h1-hm1$, $+h1-hm1$, $-h1+hm1$, and $+h1+hm1$ for h1 associated with a postcursor inter-symbol interference ("ISI") magnitude and hm1 associated with a precursor ISI magnitude.

20. The method according to claim 19, wherein the selection circuit is for steps comprising:

receiving by a first multiplexer the first possible digital output and the second possible digital output as first data inputs and coupled to receive the previous postcursor-based decision as a first control select input for selecting of a first possible digital outcome;

receiving by a second multiplexer the third possible digital output and the fourth possible digital output as second data inputs and coupled to receive the previous postcursor-based decision as a second control select input for selecting of a second possible digital outcome; and receiving by a third multiplexer the first possible digital outcome and the second possible digital outcome as third data inputs and coupled to receive the current postcursor-based decision as a third control select input for selecting of the digital output signal.

* * * * *